United States Patent [19]
Fornari

[11] 3,810,599
[45] May 14, 1974

[54] MOLD FOR MANUFACTURING TOOTHED ARTICLES SUCH AS COMBS

[76] Inventor: Massima Fornari, Via 1 Maggio 61, Vedano Olona, Italy

[22] Filed: Dec. 27, 1971

[21] Appl. No.: 211,942

[52] U.S. Cl........... 249/67, 249/141, 425/DIG. 812, 425/DIG. 805
[51] Int. Cl.............................................. B29c 7/00
[58] Field of Search........... 249/67, 68, 74, 60, 141, 249/117; 425/DIG. 812, DIG. 805, 444, 249

[56] References Cited
UNITED STATES PATENTS

| | | | |
|---|---|---|---|
| 3,474,498 | 10/1969 | Hoppes | 249/141 X |
| 532,210 | 1/1895 | Morrison | 425/DIG. 805 X |
| 2,651,810 | 9/1953 | Snyder | 425/805 X |
| 3,357,058 | 12/1967 | Kutik | 249/141 X |
| 2,975,481 | 3/1961 | Kauffman | 425/812 X |
| 2,843,896 | 7/1958 | Rinella | 249/68 |
| 2,756,460 | 7/1956 | Heintz, Jr. | 425/812 X |

FOREIGN PATENTS OR APPLICATIONS

| | | | |
|---|---|---|---|
| 608,118 | 9/1948 | Great Britain | 425/DIG. 805 |

*Primary Examiner*—J. Spencer Overholser
*Assistant Examiner*—David S. Safran
*Attorney, Agent, or Firm*—Karla F. Ross; Herbert Dubno

[57] ABSTRACT

In the molding of an article, such as a comb, comprising a back from which project a plurality of side-by-side substantially parallel teeth, use is made of a two-part mold which (instead of being split in a plane registering substantially with the plane of the article or the axes of the teeth, as is conventional) is split in a plane to which the axes of the teeth are perpendicular, so that removal of the article from the mold takes place in a direction parallel to the axes of the teeth.

1 Claim, 6 Drawing Figures

PATENTED MAY 14 1974    3,810,599
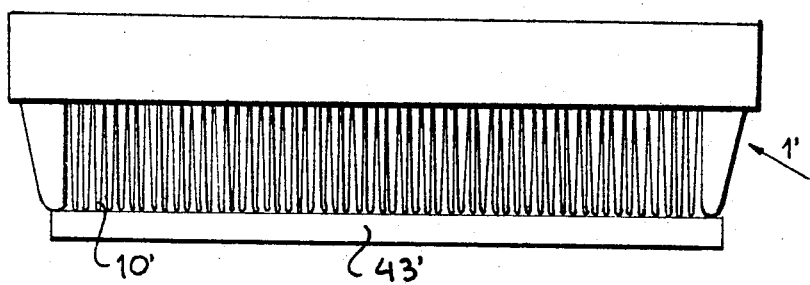
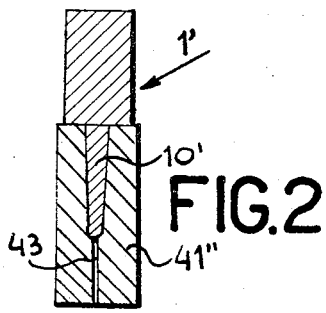
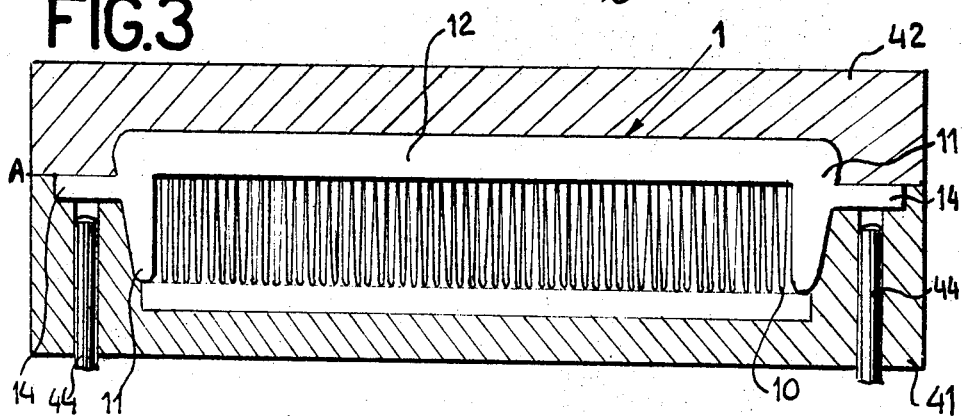
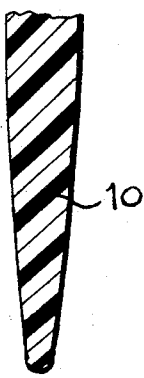
Massima FORNARI
INVENTOR
BY  Karl F. Ross
    Attorney 3,810,599

MOLD FOR MANUFACTURING TOOTHED ARTICLES SUCH AS COMBS

FIELD OF THE INVENTION

This invention concerns a method of and a mold for use in the injection molding of combs and like toothed articles (hereinafter referred to simply as "combs") which, extracted from the mold possesses. teeth which are smooth and even both in the longitudinal direction and in the transverse direction. The invention also relates to combs obtained by use of the method and of the mold.

BACKGROUND OF THE INVENTION

At present combs are produced basically in two different ways. A first technique, which dates from the origin of the comb, is that of forming the teeth from the solid by means of a sawing, milling or like operation. Classic examples of this type are firstly the horn comb and then the celluloid comb. With the advent of plastics materials and injection molding there became available a process which has clearly reduced production costs and superseded the hand manufacture of such articles. This second procedure has, however, also reduced considerably the quality of the combs. Injection molding processes having been devised, in the planning of the molds progress has evolved only in obvious and conventional ways. Thus, injection molders traditionally use a mold in two halves having a cavity corresponding to half of one comb (in the sense of the thickness) formed in the one part of the mould and a similar cavity corresponding to the other comb half formed in the second part of the mold. The defects which adversely affect the quality of these combs arise precisely because of these conventional molding techniques and, more specifically, because of the flashes which form at the joint line of the mold parts.

By having the joint line of the mold along the median plane — in the sense of the thickness of the comb — the resulting flashes or impressions project into the spaces between adjacent teeth, that is to say tranversely to the combing movement. Such flashes and impressions are substantially impossible to eliminate, but their significant varies according to the accuracy and wear of the mold and the conditions, e.g. temperature, pressure, nature of the materials and the like, under which molding takes place.

However, this is not the only existing drawback of known injection molding techniques. In constructing the mold are considerable difficulty is encountered in the forming, at different times and on different parts, of two perfectly corresponding impressions. In consequence of the very high number of teeth in a comb — in spite of every expedient and working with minimum tolerances — the tolerances accumulate, so that in those teeth in which the accumulation is a maximum a very irregular profile is obtained.

Remedies have been found even for this. For example, accurate and complicated trimming operations are carried out. However, this involves higher costs which turn out to be virtually the same as those of the combs formed from the solid. This is the reason why, nowadays, there are to be found on the market apparently identical combs of distinctly different cost and price. Those of low price are generally the ones having a flash or impression in the median plane, and they comb badly. Those having a high price are generally trimmed or obtained from the solid, and they comb well.

SUMMARY OF THE INVENTION

These drawbacks are obviated with a method and means which allow combs of superior quality to be obtained, that is to say combs which are bereft of flash, at least in correspondence with the teeth, at costs substantially equal to those of production of the combs sold nowadays at a low price. According to the whole of each of the cavities for formation of the entire tooth structure is formed in a single part of the mold so that flashes can no longer form on the tooth where they are difficult to remove and where they compromise the quality of the tooth; a flash forms in an exposed and non-functional position.

Naturally the accomplishment of this method involved the solution of various problems inherent both to the construction of the molds, and to the structure to be conferred on the comb, and to the molding techniques and to the techniques for extracting the combs from the mold. The mold according to the invention is formed by the technique of electro-molding, starting from a master comb perfectly shaped from the point of view of the possibility of forming the mold by electro-molding; moreover the inventor has ascertained that the ideal shapes from the point of view of the combing function are equally ideal for the formation of the mold by electro-molding or possibly by electro-erosion (i.e. spark erosion).

I further locate the joint line of the mold parts substantially in correspondence with the tips of the teeth or alternatively with the roots of the teeth, thereby avoiding conferring on the comb any undercut shapes considered from this line and in the opening direction of the mold parts which, of course is in the longitudinal direction of the teeth. Further to improve the molding technique, and more specifically in order to prevent imprisoned air from hampering penetration of injected plastic material into the entire length of the teeth cavities of the mold, until it arrives at the tips of these cavities, I provide for a cut, permeable to the air but absolutely impermeable to the molding material, connecting the tips of the teeth cavities with the atmosphere, so that the entering plastic material expels the air contained in the cavities of the mold.

As regards removal or extraction of the finished high quality products, it is opportune to provide the comb with a pair of projections which, after opening of the mold, can be engaged by suitable ejectors which extract the comb so that the teeth are withdrawn longitudinally from the cavities.

DESCRIPTION OF THE DRAWING

In order that the invention may be fully understood, it will be described further, by way of example, with reference to the accompanying drawing, in which:

FIG. 1 shows, diagrammatically, a suitable pattern for use in the electrochemical production of a mold in accordance with the present invention;

FIG. 2 shows, in section, the main part of a mold in accordance with the present invention, formed around the pattern of FIG. 1;

FIG. 3 is a longitudinal section showing a mold (comb in elevation), in accordance with the present invention, just a moment before opening of the mold and expulsion of the finished article;

FIG. 4 is a transverse cross section through the mold of FIG. 3;

FIG. 5 shows, to an enlarged scale, a cross section, for the teeth of the comb, which is preferred both because of its superior combing action and from the point of view of producing the mould by electro-molding or electroshaping; and FIG. 6 shows a preferred longitudinal section for the teeth of the comb of the present invention.

SPECIFIC DESCRIPTION

Referring first to FIG. 3, in order to be able to produce any comb whatsoever, for example the comb 1 shown in FIG. 3 having effective teeth 10, end teeth 11 and a back 12, one constructs a mold 4 composed of two parts, namely a lower part 41 and an upper part 42. As is known, whether the opening direction of the mold be vertical or horizontal, there is determined the joint line or plane A in which one has to effect the subdivision of the lower part 41 from the upper part 42. In the illustrated arrangement of the invention, the opening direction of the mold is vertical and is necessarily parallel to the longitudinal direction of the comb teeth 10. The joint line or plane A has, of course, to be situated at the position of maximum section of the comb considered in the direction normal to the opening direction. This means that all the sections perpendicular to the opening direction decrease, little by little, with increase in distance from the joint line or from plane A. It derives from this that the lower part 41 of the mold can be designed to produce all of the teeth of the comb, whose extractability from the mold depends upon the teeth being of tapering shape which is in perfect agreement with the power of the teeth to penetrate into the hair. As for the back 12 of the comb, it can have its maximum section at the base shoulder 12', substantially in correspondence with the roots of the teeth 10 in the case shown (FIG. 4) or at any position in its height. The important thing, for the purposes of the present invention, is that the cavity for formation of the teeth be formed entirely in one mold part, such as the mold part 41.

It is immediately evident that a mold comprising the part 41 is not easy to manufacture by conventional mechanical techniques. Therefore, in accordance with the invention, electro-molding is employed using special expedients. In this respect, one prepares a pattern 1', such as is shown in FIG. 1, having very smooth teeth 10' preferably having the longitudinal profile illustrated in FIG. 6 and the cross section shown in FIG. 5.

It is necessary to provide the mold part 41 with an outlet for the air. The pattern 1' therefore will have to present correspondingly a very thin or fine bore or tube capable of forming such an outlet (such as the outlet 43 of FIG. 2). This outlet 43, seen in transverse section in FIG. 2 and in longitudinal section in FIG. 3, is thus a slit. Such an outlet and hence the corresponding core 43' are located in correspondence with the tips of the teeth of the comb where the air could be trapped. The process of electro-forming or electro-molding consists in forming, electrolytically, an envelope or shell 41" about the pattern 1. This envelope or shell 41", which is preferably of nickel or chromium, or a similar metal, has to have characteristics such as to sustain the molding pressures likely subsequently to be involved.

The outlet 43 is permeable to air but impermeable to the plastics material. Such properties are met when the outlet 43 has a spacing between one wall and the other of 0.02 mm approximately.

The upper part 42 of the mold can be constructed in the conventional manner. For simplicity of illustration the usual injection passages have not been indicated in the drawings. As regards extraction of the comb from the mold it is sufficient to provide the comb 1 with two projections 14 and the mold with ejectors 44.

It is thus evident that, given the described manner with which the mold is opened and the high quality article is extracted, and since the mold part which forms the teeth is in a single piece, the teeth emerge as perfectly smooth moldings bereft of flash. Any flashes, feed pips and like undesired protruberances on the finished comb all arise at locations where their removal is easy. The combs therefore have ideal characteristics and can be produced at a cost not substantially greater than that of conventional combs which have flashes between adjacent teeth. Furthermore, it is possible to produce combs, for example having several rows of teeth, possibly intercalated and parallel, which hitherto has not been possible.

The invention has been illustrated in the drawings and described above by way of example only, and in a non-restrictive manner. It is of course understood that numerous modifications can be made to its whole and to its details without departing from the basic principles on which the invention is founded.

I claim:

1. A mold for injection-molding a comb comprising a first mold part and a second mold part forming a joint plane between them and separable in a direction perpendicular to said plane, said first mold part being a monoblock forward with a single row of individual parallel cavities closely spaced in the manner of comb teeth and of a configuration complementary thereto extending perpendicular to said plane and tapering away therefrom, said mold parts jointly being formed with a further cavity extending along and communicating with said parallel cavities for forming a comb back, and means for extracting a comb molded in said cavities in a direction perpendicular to the mold-separation direction, said cavities being defined only by said first and second mold parts, said monoblock first mold part being further formed with a channel connected to said parallel cavities at the ends thereof remote from said plane and permeable to air but not to plastic materials, said channel being a slit of a width of about 0.02 mm extending across all of said parallel cavities and in communication therewith, said parallel cavities each tapering laterally outwardly from a longitudinal median plane, said further cavity being formed with a pair of chambers extending parallel to said joint plane at opposite ends of said means including a pair of ejector pins parallel to said parallel cavities and perpendicular to said joint plane for respective engagement with said projections.

* * * * *